United States Patent [19]

Shew

[11] Patent Number: 4,664,298

[45] Date of Patent: May 12, 1987

[54] DUAL MODE GREASE GUN

[75] Inventor: Jerry D. Shew, Niles, Ill.

[73] Assignee: Stewart-Warner Corporation, Chicago, Ill.

[21] Appl. No.: 729,242

[22] Filed: May 1, 1985

[51] Int. Cl.$^4$ .............................................. G01F 11/06
[52] U.S. Cl. .................................. 222/287; 222/256; 222/288; 222/309; 222/383; 222/409; 74/522; 92/13.4; 92/13.7; 184/105.2
[58] Field of Search ............... 222/191, 372, 383, 287, 222/409, 288, 404, 325, 326, 309, 256; 74/522, 525; 267/158, 159; 184/105.1, 105.2, 105.3; 239/331, 333, 526; 92/13.7, 13, 13.4

[56] References Cited

U.S. PATENT DOCUMENTS

| 507,407 | 10/1893 | Bole | 267/158 X |
|---|---|---|---|
| 1,969,920 | 8/1934 | Andrews | 222/325 X |
| 2,044,044 | 6/1936 | Anthony | 29/13.7 X |
| 2,497,762 | 2/1950 | Davis | 222/256 X |
| 2,923,443 | 2/1960 | Sundholm | 222/383 X |
| 3,187,959 | 6/1965 | Morehouse | 222/326 X |
| 3,780,830 | 12/1973 | Helgerud et al. | 222/326 X |
| 3,789,742 | 2/1974 | Hershman et al. | 267/159 X |
| 4,560,095 | 12/1985 | Shew | 222/383 X |

FOREIGN PATENT DOCUMENTS 636663 9/1936 Fed. Rep. of Germany ...... 222/287

OTHER PUBLICATIONS

Lincoln Engineering Grease Gun Models 1013, 1012 & 1145, No Date, 1 page.

Primary Examiner—Joseph J. Rolla
Assistant Examiner—P. McCoy Smith
Attorney, Agent, or Firm—A. G. Douvas

[57] ABSTRACT

A hand lever operated grease gun that has both high pressure and high volume modes by changing the mechanical advantage of the lever acting on a dispensing piston. A spring biased pivotal connection between the lever and a forwardly mounted supporting link is shiftable between two positions by depression of the lever against the biasing force of the spring.

5 Claims, 6 Drawing Figures

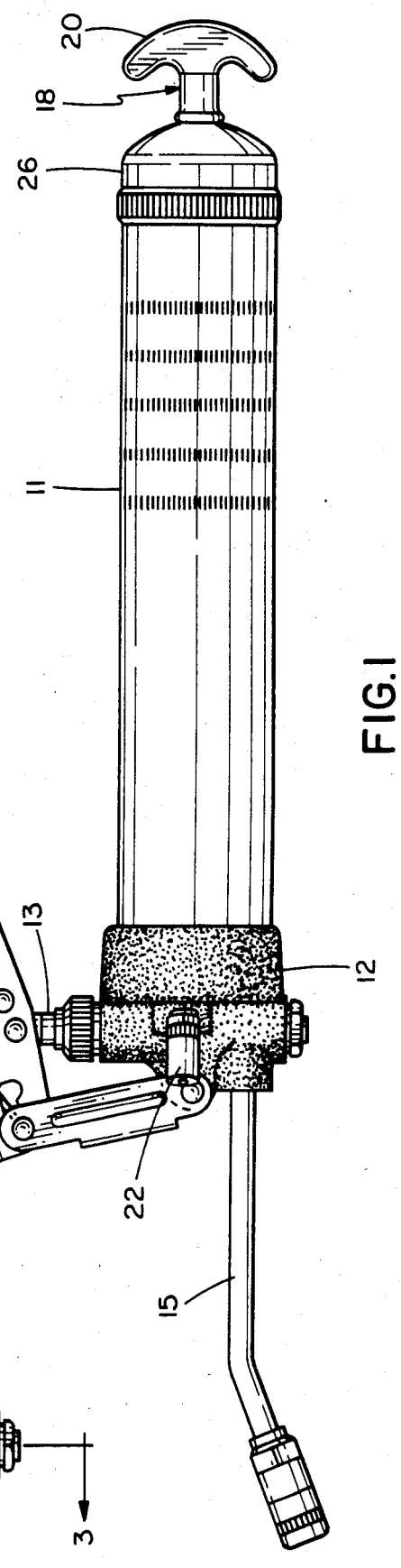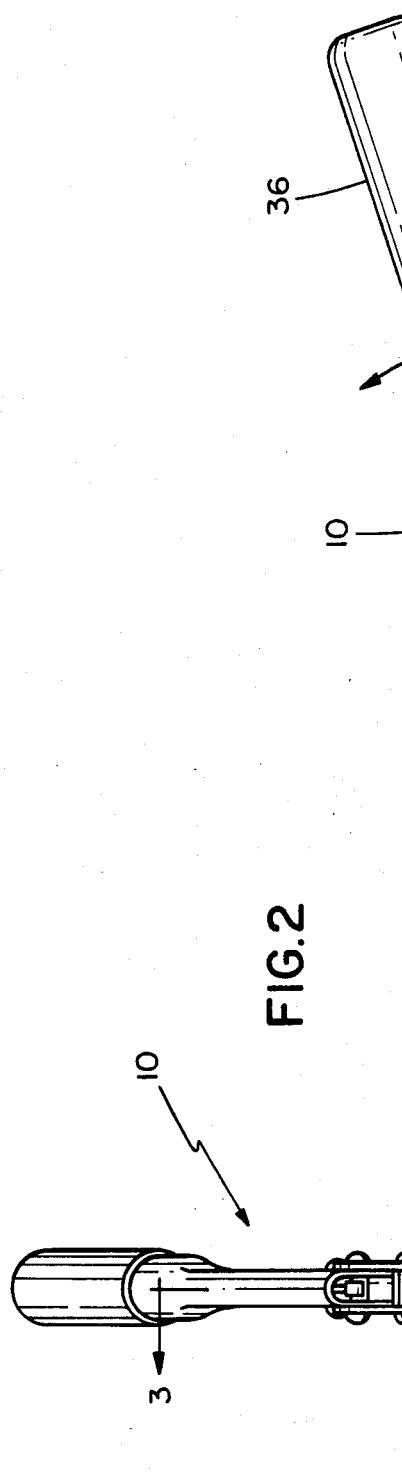
FIG.1
FIG.2

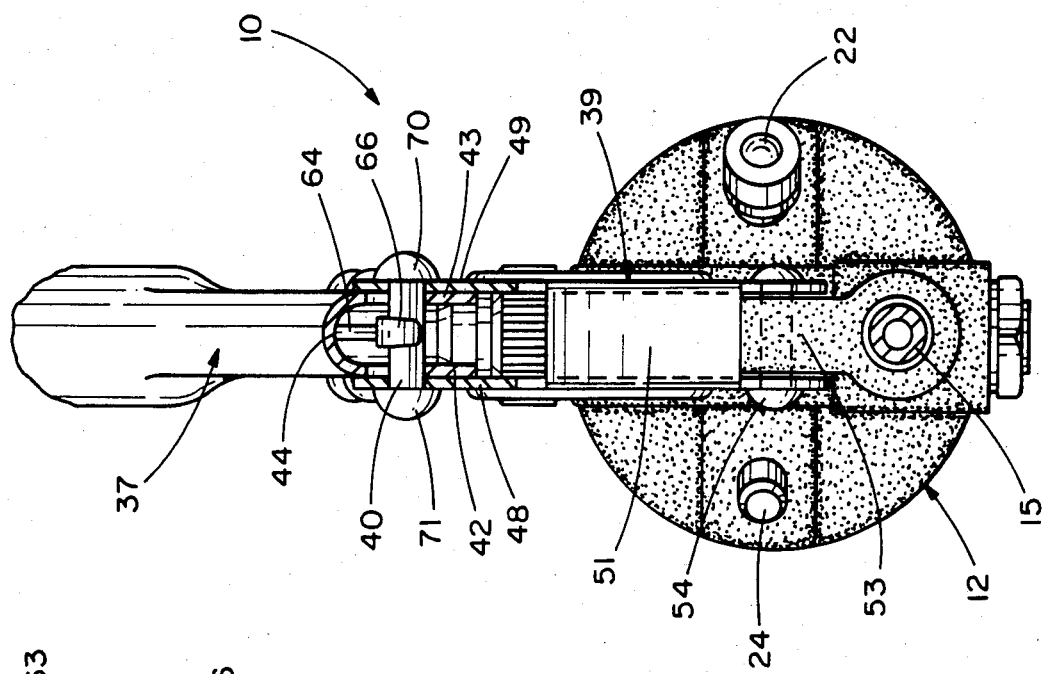
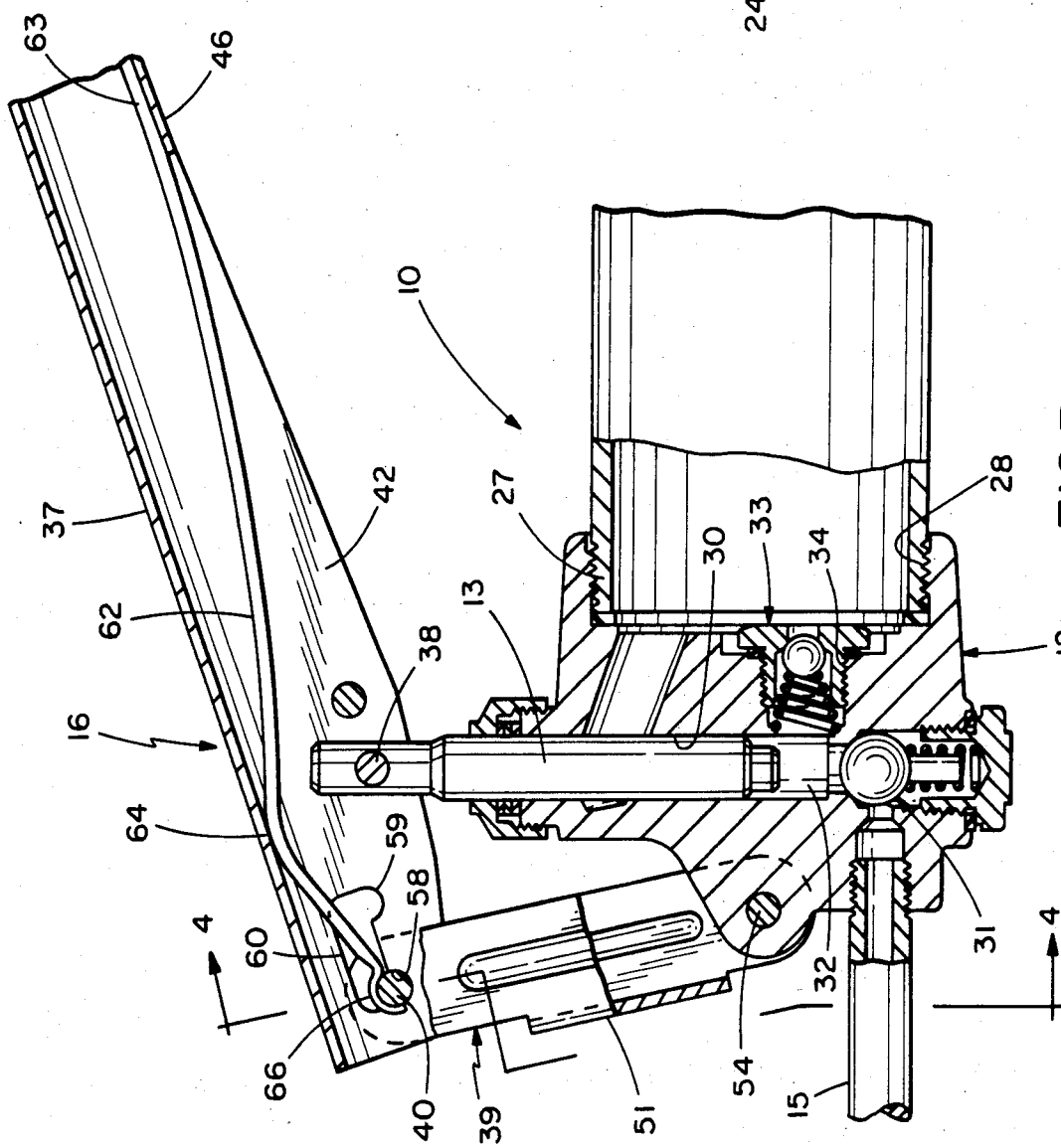

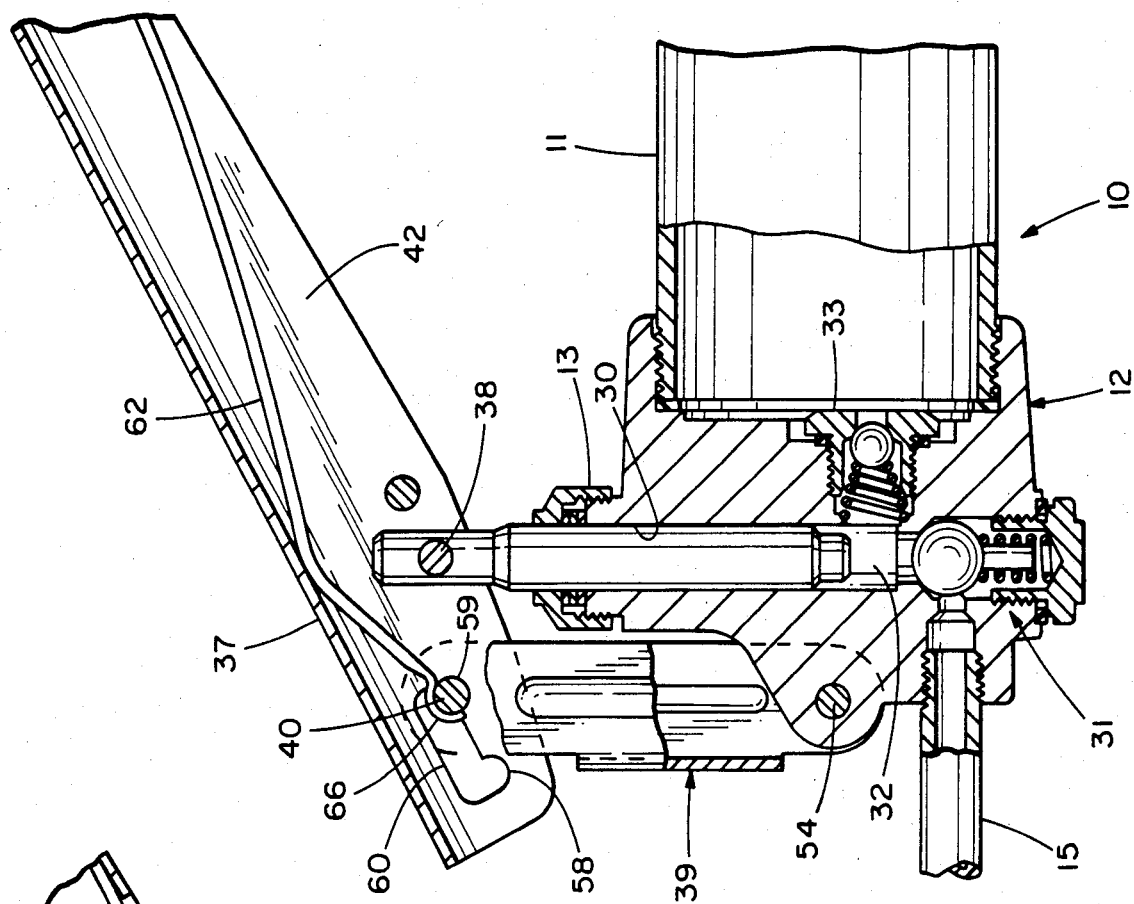
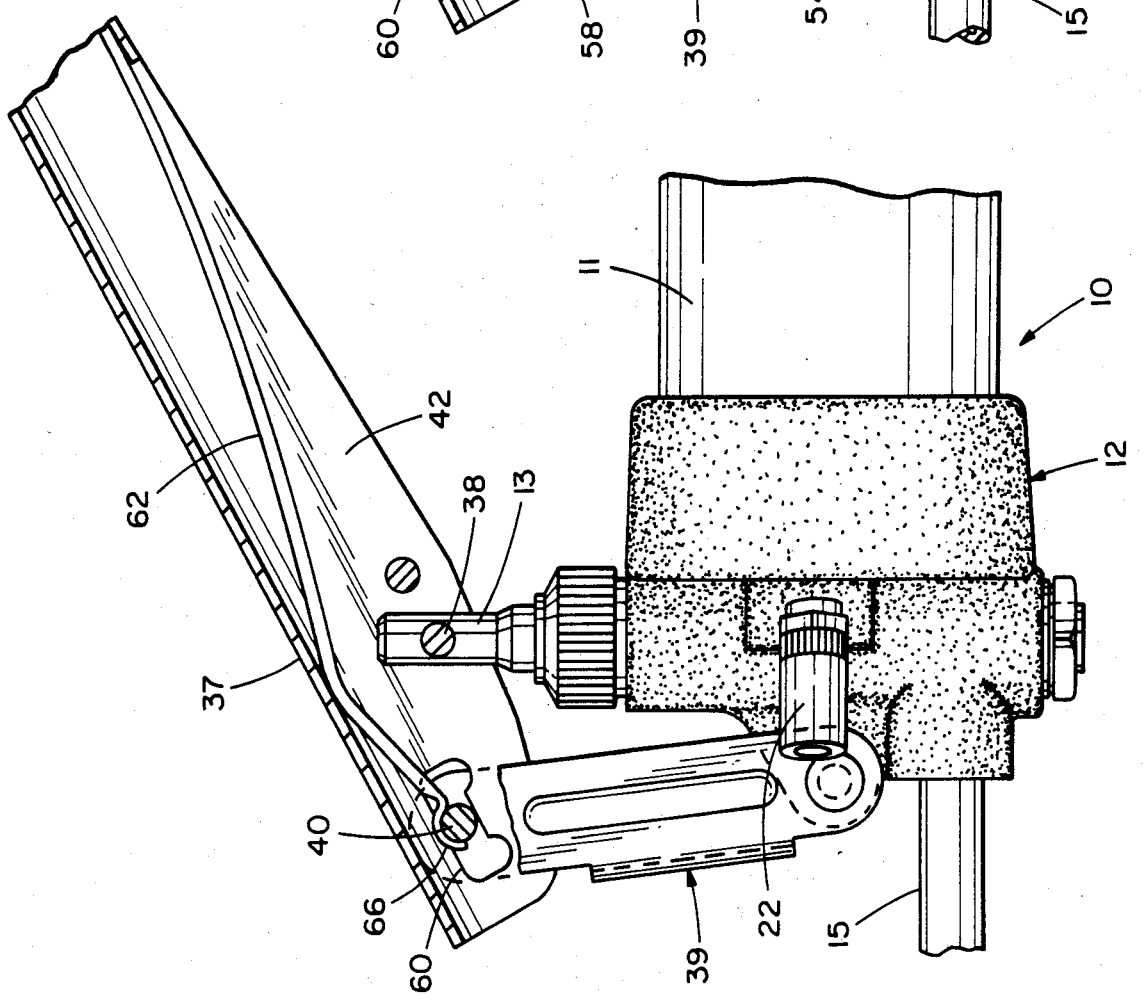

DUAL MODE GREASE GUN

BACKGROUND OF THE INVENTION

Manually operated small lubricators, commonly referred to as "grease guns", have found considerable success in the past several decades in the private consumer market frequently for personal automobile lubrication. These lubricators usually include a cylinder with one closed end that acts as a reservoir for grease which is loaded into the cylinder in several ways, one being with a prefilled cartridge, another by bulk loading lubricant directly into the cylinder and a third being by pressure loading the cylinder. The cylinder has an open end that is closed by a dispensing head that has a piston reciprocably mounted therein that forces lubricant under pressure through an outlet fitting usually extending forwardly from the head. The highly viscous lubricant is urged forwardly in the cylinder toward the head by the continuous force of a spring biased follower assembly in the rear of the cylinder that frequently includes an elastomeric follower that actually is a piston having a diameter equal to or somewhat larger than the inside diameter of the cylinder.

The dispensing piston is reciprocated in the head by a lever, frequently constructed of sheet metal, that is pivotally connected to the head by a sheet metal link and also pivotally connected to an end of the piston that projects from the head. The link is necessary to accommodate the crank-like movement of the lever as it reciprocates the piston linearly. The link is usually fastened to both the head and the end of the lever by rivets and the piston is connected to the lever in the same manner.

The head itself is usually constructed of metal and requires machining after casting of the outlet fitting, the cylinder receiving portion, the inlet and outlet passages as well as the main bore in the head that slidably receives the piston.

Frequently grease fittings against which the grease gun outlet fitting is impressed to supply lubricant become clogged with foreign material and considerable grease pressure is required to break up this foreign material and deliver lubricant through the fitting. In such cases it is desirable to have a short effective lever arm acting on the piston to achieve high pressure without particular regard for the volume of lubricant being dispensed. Conversely, in cases where the fittings are clear, lubricant pressure is not as important as the volumetric discharge capacity and in this case it is desirable that the effective lever arm acting on the piston be fairly long to dispense lubricant more rapidly.

One attempt to incorporate both functions in a single lever gun, is a dual pressure lever gun models 1013 and 1145, manufactured by Lincoln Engineering. This lever gun incorporates a two-position pivot that varies the effective length of the crank arm between the forward link and the sliding piston. This enables the lever gun to achieve either a long stroke mode or a short stroke mode to accomplish respectively either high volume (low pressure) or high pressure (low volume) delivery. In order to shift the lever from long stroke to short stroke it is necessary to remove a pivot pin connection between the forward link and the lever and replace it in another position on the lever. This is a rather time-consuming process and therefore discourages the operator from shifting from one mode to the other, and this of course detracts from the purpose and effectiveness of the dual mode function.

It is a primary object of the present invention to ameliorate the problems noted above in hand operated lever grease guns.

SUMMARY OF THE PRESENT INVENTION

In accordance with the present invention a hand operated lever grease gun is provided that is capable of either a high pressure mode or a high volume mode by changing the effective length of a crank arm portion of the lever acting on the piston without disassembling any part of the lever's pivotal connection and without any threaded adjustments.

Toward this end the lever of the present grease gun is pivotally supported on a head by a short link that provides the pivot axis for the lever. The lever is also pivotally connected to the piston and the distance between the axes of the pivotal connection between the lever and the forward link and the pivotal connection between the lever and the piston, is the effective crank arm length and this distance is changeable by providing two spaced positions for pivoting the lever on the link. In the shorter crank arm position the mechanical advantage of the lever acting on the piston is increased while the stroke for a given angular movement of the lever decreases, and this produces the short stroke high-pressure mode of the present lever gun. In the longer crank arm position the mechanical advantage of the lever acting on the piston decreases while piston stroke per angular movement of the lever increases and this effects the long stroke or high volume mode of the present grease gun.

The lever is shifted relative to the forward link by simply depressing the lever toward the link and shifting the link to its other position without requiring removal of any pivot pins. Toward this end the lever is provided with two pivot bores connected by a cross slot that is offset with respect to the axes of the pivot bores. The forward link has a fixed pivot pin sized to be pivotally supported in either of the pivot bores in the link as well as to slide through the slot. An elongated leaf-type spring seated within the "U" shaped cross-section of the lever engages and biases the link pivot pin away from the cross slot toward the pivot bores in the lever. By depressing the top of the lever against the biasing force of the spring, the pivot pin moves into the cross slot and permits the operator to easily shift the link over to the other pivot bore. Upon release of the lever the spring snaps the pin into the selected bore.

BRIEF DESCRIPTION OF THE DRAWINGS

FIG. 1 is a plan view of a lever operated grease gun according to the present invention;

FIG. 2 is a front view of the grease gun illustrated in FIG. 1;

FIG. 3 is an enlarged, longitudinal fragmentary section of the grease gun illustrated in FIGS. 1 and 2 with the link pivot pin in the high volume mode position;

FIG. 4 is a front view partly in section taken generally along line 4—4 of FIG. 1;

FIG. 5 is a fragmentary view similar to FIG. 3 with the link pivot pin shifted from the high volume mode position in FIG. 3 and into the cross slot; and FIG. 6 is a fragmentary section similar to FIGS. 3 and 5 with the link pivot pin in its high pressure mode position.

DETAILED DESCRIPTION OF THE PREFERRED EMBODIMENT

Referring to the drawings and particularly FIGS. 1 to 4, a lever operated grease gun 10 is illustrated generally including an elongated cylinder 11 adapted to receive lubricant, a generally cup-shaped metal head 12 having a metal piston 13 slidable therein that delivers lubricant under pressure through an outlet tube 15, and a lever assembly 16 for reciprocating the piston 13 in head 12. A follower assembly 18 (only partly shown in the drawings) is mounted in the cylinder 11 and urges lubricant therein toward the head 12. This follower assembly includes a rod (not shown) connected to handle 20 that slidably receives an elastomeric follower that are conventional in construction and form no part of the present invention.

The cylinder 11 may receive a pre-filled lubricant cartridge, and may also be loaded by hand or by bulk loading with lubricant under pressure through an inlet valve 22 in head 12. As seen in FIG. 2 a button-operated relief valve 24 is provided in head 12 that when depressed permits air entrapped within the cylinder 11 or head 12 to escape.

Cylinder 11 has a rear open end closed by a removable end cap 26 and an open front end 27 threadedly engaged in enlarged central bore 28 in the rear of the head 12.

Head 12 has a transverse bore 30 extending therethrough that slidably receives piston 13 and defines a valve seat for an outlet ball check valve 31 that opens under pressure in chamber 32 to permit lubricant in chamber 32 to be expelled through outlet tube 15. An inlet ball check valve 33 is mounted in axial head bore 34 interconnecting the cylinder 11 and chamber 32. Valve 33 opens in response to decreased pressure in chamber 32 as piston 13 withdraws permitting lubricant in the cylinder 11 to be drawn into chamber 32. Upon inward movement of piston 13 and an increase in pressure in chamber 32, valve 33 closes, preventing the return of lubricant to cylinder 11 and valve 31 opens, permitting lubricant to be expelled through outlet tube 15.

The lever assembly 16 as seen is clearly in FIGS. 3 and 4 is essentially a crank arm acting on piston 13 that creates a mechanical advantage whereby the operator, upon grasping handle 36 (FIG. 1) with one hand and cylinder 11 with the other may pivot lever 37 up and down and dispense lubricant through outlet tube 15. The lever 37 is pivotally connected to piston 13 by rivet pin 38 and pivotally connected to a forward link 39 by a pivot pin 40 carried at one end of the link 39.

The lever 37 is metal and elongated and U-shaped in configuration throughout most of its forward end, as illustrated clearly in FIG. 4, and defined by spaced parallel side walls 42 and 43 connected together by a bite portion 44. The rear end 46 of the lever 37 (see FIG. 3) is closed by bending the lower portions of side walls 42 and 43 together.

Link 39 has speed parallel side walls 48 and 49 that engage the outside of lever walls 42 and 43 as seen clearly in FIG. 4. Side walls 48 and 49 are connected together by a short transverse web portion 51. The lower end of the link 39 is pivotally connected to an integral head boss 53 by pin 54.

The pivot pin 40 may be pivotally connected to the lever 37 in either of two positions. Toward this end the lever side walls 42 and 43 have spaced semi-circular bores 58 and 59 therethrough connected by a transverse slot 60 that is offset with respect to the axes of the bores 58 and 59.

An elongated steel rod spring 62 is provided for the purpose of biasing pivot pin 40 into one of the pivot bores 58 and 59. Rod spring 62 has a rear end 63 reacting against the closed rear end 46 of the lever 37, has a gently bent mid portion 64 that reacts against the inside of lever bite portion 44, and has a flattened arcuate forward end 66 engaging the side of the pin 40 opposite the pivot bores 58 and 59.

In the position of the pivot pin 40 illustrated in FIG. 3, the lever gun 10 is in its high volume mode because the distance between the axis of pivot bore 58 and the axis of piston pivot pin 38 is greater than the distance between the axis of pivot bore 59 and the axis of the pin 38. The pivot pin 40 is shifted from the pivot bore 58 to pivot bore 59 by depressing the bite portion 44 of the lever 37 downwardly in the vicinity of pivot pin 40. This shifts pin 40 upwardly into cross slot 60 enabling the pin 40 to be shifted in slot 60 as seen in FIG. 5 by pushing with one thumb on pin head 70 or enlarged pin end 71 (see FIG. 4) until the pin is aligned over the pivot bore 59. Lever 37 is then released from its depressed position and spring 62 snaps and locks pin 40 in the slot 59 as shown in FIG. 6.

With the pivot pin 40 in pivot bore 59, the distance between pin 40 and piston pivot 38 is shortened increasing the mechanical advantage of lever 37 acting on piston 13 and placing the lever gun 10 in a high pressure mode.

Pin 40 is shifted back to pivot bore 58 by again depressing the forward end of lever 37 toward link 39 against the biasing force of spring 62 and pushing pin head 70 or enlarged pin head 71 toward bore 58 and then releasing the lever 37 when pin 40 is over bore 58 enabling spring 62 to snap pin 40 into the bore.

I claim:

1. A hand lever operated lubricant dispenser, comprising: an elongated cylinder adapted to receive lubricant, a head mounted on one end of the cylinder and having a bore therein slidably receiving a piston, a discharge outlet in the head selectively communicable with the bore, an inlet for conveying lubricant from the cylinder to the bore, a two position lever assembly for reciprocating the piston in either a high volume or high pressure mode including an elongated lever pivotally mounted intermediate its ends on the distal end of the piston about an axis fixed with respect to both the piston and the lever, a link pivotally connected to the head at one end and pivotally connected at its other end to one end of the lever, and means for changing the distance between the pivotal connections between the link and the lever and the piston and the lever without disassembling either pivotal connection to achieve either a high pressure mode or a high volume mode of dispenser operation, said means for changing the distance between the pivotal connections between the link and the lever and the piston and the lever including a pivot pin carried by the end of the link, first and second spaced pivot bores in the end of the lever connected by a slot each selectively receiving the link pivot pin, said slot extending generally parallel with the lever and said pivot bores extending transversely from the slot toward the head, and spring means reacting against the lever and biasing the pin toward the head and the bottom of each of the pivot bores in the link, the side of the lever opposite the head adjacent the pin being unobstructed to permit manual depression of the handle toward the head against the biasing force of the spring means incident to shifting the pin from one bore to the other.

2. A hand lever operated lubricant dispenser as defined in claim 1, wherein the spring means includes an elongated leaf-type spring mounted in and reacting against the lever having an arcuate end engaging and reacting against the pivot pin.

3. A hand lever operated lubricant dispenser, comprising: an elongated cylinder adapted to receive lubricant, a head mounted on one end of the cylinder and having a bore therein slidably receiving a piston, a discharge outlet in the head selectively communicable with the bore, an inlet for conveying lubricant from the cylinder to the bore, a two position lever assembly for reciprocating the piston in either a high volume or high pressure mode including an elongated lever pivotally mounted intermediate its ends on the distal end of the piston about an axis fixed with respect to both the lever and the piston, a link pivotally connected to the head at one end and pivotally connected at its other end to one end of the lever, means for changing the mechanical advantage of the lever acting on the piston including a pivot pin fixed to the end of the link adjacent the lever, two spaced pivot bores in the end of the lever adjacent the link connected by a slot, the side of the lever opposite the head adjacent the pin being unobstructed, said slot extending generally parallel with the lever and said pivot bores extending transversely from the slot toward the head, and a spring reacting against the lever for biasing the pin toward the head and the bottom of either of the lever bores in a direction away from the connecting slot so that the pin may be shifted from one lever bore to the other by depressing the lever adjacent the pin against the biasing force of the spring in a direction so the pin enters the slot and then shifting the pin forwardly or backwardly in the slot to the other bore.

4. A hand lever operated lubricant dispenser as defined in claim 3 wherein the spring includes an elongated leaf-type spring mounted in and reacting against the lever having an arcuate end engaging and reacting against the pivot pin.

5. A hand lever operated lubricant dispenser, comprising: an elongated cylinder adapted to receive lubricant, a head mounted on one end of the cylinder and having a bore therein slidably receiving a piston, a discharge outlet in the head selectively communicable with the bore, an inlet for conveying lubricant from the cylinder to the bore, a two position lever assembly for reciprocating the piston in either a high volume or high pressure mode including an elongated lever pivotally mounted intermediate its ends on the distal end of the piston about an axis fixed with respect to both the lever and the piston, a link pivotally connected to the head at one end and pivotally connected at its other end to one end of the lever, means for changing the mechanical advantage of the lever acting on the piston including a pivot pin fixed to the end of the link adjacent the lever, two spaced pivot bores in the end of the lever adjacent the link connected by a slot, said slot extending generally parallel with the lever and said pivot bores extending transversely from the slot toward the head, and a spring reacting against the lever for biasing the pin toward the head and the bottom of either of the lever bores in a direction away from the connecting slot including an elongated leaf-type spring mounted and reacting against the lever having an arcuate end engaging and reacting against the pivot pin, the side of the lever opposite the head adjacent the pin being unobstructed to permit manual depression of the lever against the biasing force of the spring incident to shifting the pin from one bore to the other.

* * * * *